Oct. 6, 1925.
W. G. MAURER
1,555,925
METHOD OF MANUFACTURING BOLTS
Filed June 19, 1923
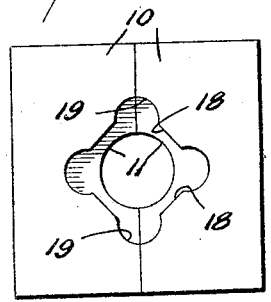
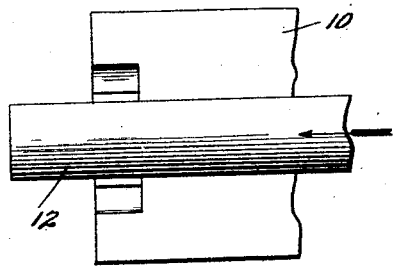
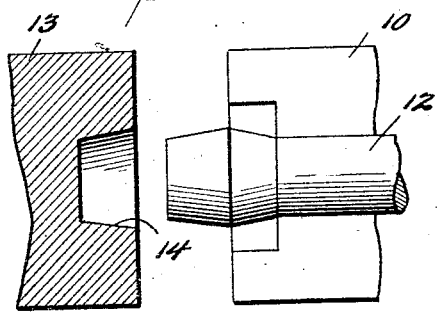
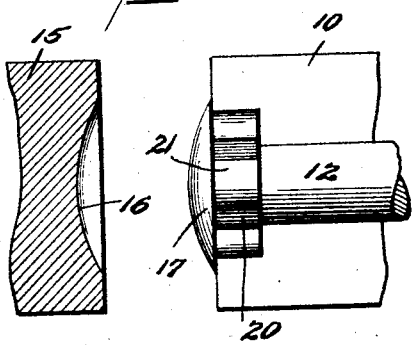
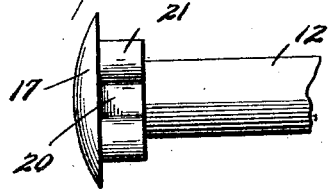
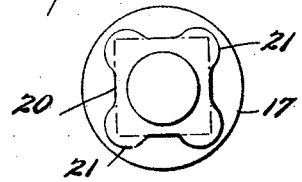
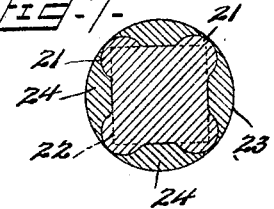
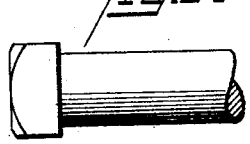
Inventor
W. G. Maurer,
By Watson, Coit, Morse & Grindle
Attorney Patented Oct. 6, 1925.

1,555,925

UNITED STATES PATENT OFFICE.

WILLIAM G. MAURER, OF LEBANON, PENNSYLVANIA, ASSIGNOR TO BETHLEHEM STEEL COMPANY, OF BETHLEHEM, PENNSYLVANIA, A CORPORATION OF PENNSYLVANIA.

METHOD OF MANUFACTURING BOLTS.

Application filed June 19, 1923. Serial No. 646,460.

*To all whom it may concern:*

Be it known that I, WILLIAM G. MAURER, a citizen of the United States, and residing at Lebanon, Lebanon County, State of Pennsylvania, have invented certain new and useful Improvements in Methods of Manufacturing Bolts, of which the following is a specification.

The present invention relates to methods of manufacturing bolts.

It has been found that the most inexpensive way of manufacturing bolts with polygonal heads is by what is known as the cold press method. In accordance with this method of manufacture a rod is fed into a heading machine of well known type, and a cylindrical head is formed thereon by an upsetting plunger which moves axially against the end of the blank and causes the cold metal to flow into a shallow cylindrical die. The diameter of the cylindrical head is necessarily greater than a diagonal across a finished bolt head, in order that square corners may be formed in a subsequent trimming operation. It is found with this large excess of metal to be removed that it is necessary to anneal the blank before the trimming operation, and that even when this is done there is great wear on the trimming die as well as much loss of material sheared off and discarded. Furthermore, since the metal is actually sheared in the trimming operation for only 40% of the depth of the cut, the separation of the remainder is in reality by tearing the fibres of the remaining portion, the faces of the head being, as a result, left rough so that the resulting bolts are of inferior quality unless the heads are retrimmed, and a lubricant used. Retrimming of course increases the cost of manufacture.

The object of the present invention is to provide a new and improved method for manufacturing bolts whereby bolt heads having smooth faces may be quickly and conveniently fabricated with a minimum of expense, and with a great saving of material.

According to this method portions of the flats of the head are formed in the heading operation, leaving only excess material at the corners to be removed for a subsequent trimming operation. As a consequence the trimming operation is easily accomplished and without requiring the blank to be annealed as was formerly found necessary. A large amount of material is saved and furthermore the surface of the finished bolt head is quite smooth and compares favorably with a machined surface so that no second trimming operation is necessary to produce a bolt of entirely satisfactory finish.

The improved method and apparatus will be described at length in the following paragraphs and the apparatus is illustrated in the accompanying drawing in which:

Fig. 1 is a front elevation of the split die employed;

Fig. 2 is a vertical section through the same showing the rod in position to be operated on;

Fig. 3 shows in vertical section the die and a plunger, after the first operation upon the blank has been performed;

Fig. 4 is a similar view but showing a different upsetting plunger, and after operating upon the blank held in the die;

Fig. 5 is a side elevation of the bolt as it comes from the die illustrated in Figure 4 and before the final trimming operation;

Fig. 6 is a bottom view of the same;

Fig. 7 is a diagrammatic view showing the saving of metal realized by forming the bolt head according to the present invention, as compared with the prior method; and Fig. 8 is a side elevation of a finished bolt.

The die is formed in two parts 10, 10 having registering semi-circular openings 11, 11 through which the blank or rod is fed in the direction of the arrow (Figure 2). The die may be supported and operated by a bolt heading machine of well known type in which the various operations may be performed in the sequence desired, invention in the general construction and operation of the machine not being claimed, but only in the design of the die and the manner of forming the finished bolt.

After the rod is positioned, as shown in Figure 2, it is sheared off to a suitable length by mechanism not illustrated and is moved into axial alignment with a punch 13 having a frusto-conical recess 14 in its face. Movement of the punch against the die results in the spreading of the metal of the blank as shown, its length being decreased and its diameter increased. The head carrying the punches is then moved until the blank is axially aligned with a second punch 15 having a shallow spherical recess in its face. This punch operates upon the blank and causes the metal to flow until the die is filled. Inasmuch as there is an excess of metal, that is, more metal operated on than the die will hold, a circular flash 17 is left on top of the bolt head, as shown in Figure 4.

Referring now to Figure 1 it will be seen that the die has four faces 18 which are flat and which form portions of the four sides of a square. Each pair of adjacent faces is connected by a curved face 19, substantially semi-circular, so that the die has what might be called the general shape of a four leaf clover as viewed from the front. Under the influence of the punch 15 the metal of the blank is upset and is caused to fill the die completely, flowing into the semi-circular recesses and completely filling them. After the completion of this operation the blank is ejected and appears as shown in Figure 5, with four flat faces 20 and four semi-circular corner portions 21.

The next operation is a trimming operation and the blank is passed through a trimming die having a square cross section the same as that illustrated in dot and dash lines 22 in Figure 7. The cylindrical corners are sheared off in this trimming operation. The outer circle 23 in Figure 7 indicates the periphery of a circular head formed on a bolt blank, preparatory to trimming, in fabricating a square headed bolt in accordance with the former method of manufacture. In such former method the entire amount of metal lying between the square 22 and circle 23 was removed in the trimming operation. In accordance with the present invention only portions of the semicircular corners 21 are removed by trimming, and hence there is a saving in each bolt blank of an amount of material corresponding to the area and depth of the portions 24, Figure 7, lying between the circle 23 and the square 22 including the semi-circular corners 21. This is a very considerable saving in metal and it is obvious also that the trimming operation may be much more easily accomplished. It is found that the surfaces of the bolt heads made in accordance with this method are quite smooth and that it is not necessary to subject them to a subsequent trimming operation to realize a product of high quality.

Having thus described the invention what is claimed as new and desired to be secured by Letters Patent is:

1. The method of forming polygonal heads on bolts consisting in first forming by an upsetting operation a head having its flat faces substantially finished in part and with excess material at the corners, and in then removing the excess material at the corners by a trimming operation.

2. The method of forming polygonal heads on bolts consisting in first forming by an upsetting operation a head having the middle portions of its flat faces substantially finished, and having excess metal at each end of each said flat surface, and in removing the excess metal by a subsequent trimming operation.

3. The method of forming polygonal heads on bolts consisting in first forming by an upsetting operation a head having the flat faces finished in part and having substantially semicircular corner portions, and in removing the excess material at the corners by a trimming operation to provide a head having flat faces and sharp corners.

4. An article of manufacture consisting in a bolt blank having a head with a plurality of flat faces and corners projecting outwardly beyond the faces and adapted to be trimmed off in a trimming operation so that the bolt head is polygonal.

5. An article of manufacture consisting in a bolt with a head having a plurality of faces and semi-circular corners extending outwardly beyond the faces, said semi-circular corners being adapted to be trimmed off in a trimming operation to provide a polygonal bolt head.

6. The method of forming polygonal heads on bolts consisting in first forming by an upsetting operation a head having the flat faces finished in part and with excess material at the corners and on the top thereof, and in removing the excess material at the corners, and part of the excess material at the top in a trimming operation.

In testimony whereof I hereunto affix my signature.

WILLIAM G. MAURER.